United States Patent

[11] 3,590,710

| | | | |
|---|---|---|---|
| [72] | Inventors | Naoyuki Uno<br>Ooi-Machi;<br>Tetsuo Sasaki, Fukuoka-Machi, both of, Japan | |
| [21] | Appl. No. | 720,192 | |
| [22] | Filed | Apr. 10, 1968 | |
| [45] | Patented | July 6, 1971 | |
| [73] | Assignee | Asahi Kogaku Kogyo Kabushiki Kaisha<br>Tokyo-to, Japan | |
| [32] | Priority | Apr. 27, 1967 | |
| [33] | | Japan | |
| [31] | | 42/27125 | |
| [54] | AUTOMATIC FILM ADVANCING MECHANISM<br>16 Claims, 1 Drawing Fig. | | |
| [52] | U.S. Cl. | | 95/31 E,<br>95/53 E |
| [51] | Int. Cl. | | G03b 1/12,<br>G03b 9/64 |
| [50] | Field of Search | | 95/31, 31<br>AC, 31 FS |

[56] References Cited
UNITED STATES PATENTS

| | | | |
|---|---|---|---|
| 2,679,790 | 6/1954 | Clark | 95/31 |
| 3,007,385 | 11/1961 | Fukuoka | 95/31 |
| 3,138,080 | 6/1964 | Jacobson | 95/31 |
| 3,171,338 | 3/1965 | Winkler | 95/31 |
| 3,064,522 | 11/1962 | Fukuoka | 95/31 X Elec. |

*Primary Examiner*—Samuel S. Matthews
*Assistant Examiner*—Russell E. Adams, Jr.
*Attorney*—Stanley Wolder ABSTRACT: A film advancing mechanism includes a drive motor which is connected to a battery through a normally open switch actuated by a solenoid which is energized an adjustable interval following the camera shutter closing by means of an adjustable RC time delay network. The solenoid is maintained energized only by an AC current produced by the rotating motor. An RC delay network and amplifier responsive to the deenergization of the motor prevents the release of the shutter an interval following the motor deenergization to permit the relaxing of the advanced film frame.

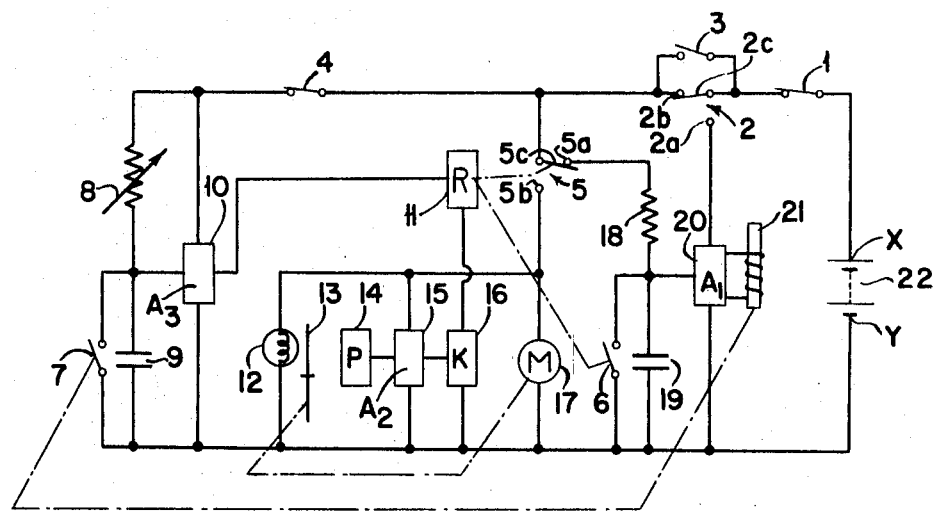

AUTOMATIC FILM ADVANCING MECHANISM

BACKGROUND OF THE INVENTION

The present invention relates generally to improvements in photographic cameras and it relates particularly to an improved electric motor driven automatic film advancing mechanism.

Various forms of electric motor driven automatic film advancing mechanisms for still cameras have been proposed and employed but these possess many drawbacks and disadvantages. Requirements for electric motor film advancing mechanisms are that the film should not advance while the shutter is open, the shutter should not be released while the film is advancing, and the electric motor should be promptly deenergized upon completion of an increment advance of the film. The conventional forms of motor driven advancing mechanisms are of the mechanical control type in which the motor is connected by a slipping clutch to a takeup member so that slippage occurs between the motor and the takeup member upon the completion of a film frame advance and the stopping of the film to open a switch and interrupt the motor energizing circuit, and of the electrical control type where the increased current to the motor consequent to the stopping there functions to effect the cutting of the current to the motor. Both the conventional mechanical and electrical film advancing motor controls leave much to be desired. The mechanical control system requires the use of an expensive and complex clutch arrangement which is frequently unreliable and the conventional electrical system is highly inefficient and likewise unreliable.

SUMMARY OF THE INVENTION

It is a principal object of the present invention to provide an improved photographic camera.

Another object of the invention is to provide in a camera an improved automatic electric motor driven mechanism for the increment advance of the film.

Still another object of the present invention is to provide an improved electric motor driven film frame advancing mechanism provided with an interlocking system which prevents concurrent operation of the shutter and the film advance.

A further object of the present invention is to provide an improved electric motor driven film advancing mechanism in which the camera shutter can be released only upon relaxation of the film following the advance thereof.

Still a further object of the present invention is to provide an improved automatic electric motor driven film advancing mechanism which can perform rapid sequence photography for an adjustable number of successive frames.

Another object of the present invention is to provide a mechanism of the above nature characterized by its reliability, adaptability and flexibility.

The above and other objects of the present invention will become apparent from a reading of the following description taken in conjunction with the accompanying drawing which illustrates a preferred embodiment thereof.

In a sense the present invention contemplates the provision of an automatic film advancing mechanism comprising a film advancing drive motor, first means responsive to the rotation of said motor for producing a control signal, and second means including a switching network responsive to said control signal for connecting said motor to a source of motor energizing current. The control signal is a periodically varying signal which is generated or effected by the rotating motor, and is amplified by an AC amplifier which blocks any steady state DC signal and the amplified signal is rectified and employed to energize a relay for opening the motor energizing circuit.

Another feature of the present invention is the provision of a mechanism which prevents the release of the camera shutter until the film is relaxed following the advance thereof. This is effected by disabling the shutter release network for an interval determined by a timing network following the deenergization of the motor. Another feature is the provision of a timing network in the motor control circuit which delays the film advance a minimum interval following the shutter release so as to prevent film advance while the shutter is open. The latter network is adjustable to control the interval between successive frames in rapid sequence photography.

BRIEF DESCRIPTION OF THE DRAWING

The drawing is schematic block diagram of a film advancing mechanism embodying the present invention.

DESCRIPTION OF THE PREFERRED EMBODIMENT

Referring now to the drawing which illustrates a preferred embodiment of the present invention, the reference numeral 17 generally designates an electric drive motor which is mechanically connected to the film takeup spindle of the camera incorporating the improved film advancing mechanism. Also associated with and mounted on the camera is a switch 4 which is so mechanically associated with the camera film advancing mechanism in any suitable known manner so as to be closed upon the closing of the camera shutter and be opened during the advance of the film but shortly before the completion of such advance. A double throw switch 2 includes a switch arm $2_c$, a normally open contact $2_a$ and a normally closed contact $2_b$, the switch arm $2_c$ being operable by a shutter release button mounted on the camera. The camera shutter is released by a shutter release member defined by a solenoid 21 which cooperates with a shutter release element in a known manner. A selectively operable sequence control switch 3 is connected between switch arm $2_c$ and contact $2_b$ and is accessible from outside the camera body.

An energizing batter 22 includes a terminal $x$ connected through a main switch 1 to the switch arm $2_c$, and an opposite grounded terminal $y$. A variable resistor 8 has one terminal connected through a timing capacitor 9 to battery terminal $y$, the capacitor 9 and variable resistor 8 defining a variable timing RC network whose output is across the capacitor 9. A switch type DC amplifier 10 having a Schmidt circuit input has its power terminals connected to the outer end of resistor 8 and to battery terminal $y$ and its control input connected across the capacitor 9, the output of the amplifier 10 being connected to a relay solenoid 11 so that upon triggering voltage building up on capacitor 9 which is applied to the input of the amplifier 10 the solenoid 11 in sufficiently energized to actuate the associated arm $5_c$ of a relay switch 5 and the arm of a normally open switch 6 to a closed position. The relay switch 5 includes a normally closed contact $5_a$ and a normally open contact $5_b$ which is closed by arm $5_c$ only upon energization of solenoid 11, the arm $5_c$ being connected to switch contact $2_b$.

The motor 17, an electric lamp 12, and the power terminals of an amplifier 15 are each connected between battery terminal $y$ and relay switch contact $5_b$, the amplifier 15 being a low frequency AC amplifier of any known type which blocks and is unresponsive to the DC input or level but amplifies only a varying or AC signal. A photosensitive element 14, such as a photoelectric cell or a suitable powered photoconducter is exposed to the light from lamp 12 and has its output connected to the input of the amplifier 15. A light chopper 13 which may be a spoked or apertured disc or a shutter is located between lamp 12 and photosensitive element 14 and is rotated by the motor 17 to periodically interrupt the light incident of photosensitive element 14. Thus a varying signal is applied to the input of the amplifier 15 only during the rotation of the motor 17. It should be noted that any other suitable mechanism may be employed for producing a varying electric signal with the rotation of motor 17, such as for example, a commutater system, a strain gauge periodically strained by a cam rotated by the motor 17, a breaker point system actuated by the rotating motor, or the like. The AC signal output of the amplifier 15 is rectified by a detector network 16 and the rectified signal is applied to the relay solenoid 11. Thus, during rotation of the motor 17 a sufficient signal is produced by the components 12—16 to energize the solenoid 11 adequately to actuate the switches 5 and 6, and upon the stopping of the motor 17 there is no or insufficient output from the detector 16 for the actuation energization of relay solenoid 11.

A DC switch amplifier 20 of a type similar to the amplifier 10 including a Schmidt circuit input has its output connected to the shutter release actuating solenoid 21 and its power terminals connected to battery terminal y and switch contact $2_a$ respectively. A timing capacitor 19 across which the switch 6 is connected, is connected between battery terminal y and the control input terminal of amplifier 20. A resistor 18 is connected between the switch contact $5_a$ and the terminal of the capacitor connected to the control input of amplifier 20, and defines with the capacitor 19 an RC timing network whose output is across the capacitor 19 and functions to apply a triggering signal to the amplifier switch 20 a predetermined interval following the energizing of the timing network. A normally open switch 7 is connected across the capacitor 9 and is actuated to a closed position by and upon energization of the release solenoid 21.

Considering now the operation of the mechanism described above as employed in the automatic single film frame advance, the film is loaded in the camera in the usual fashion and may be advanced by the use of the camera film advance lever until its advance is stopped by the camera in the known manner, in which state the switch 4 is open. The switch 3 is opened and the main switch 1 is closed thus readying the camera, the motor 17 being deenergized by reason of the switch 4 being open and the motor 17 being deenergized since the solenoid 11 is deenergized whereby switch contact $5_b$ is open. In the ready condition of the mechanism, solenoid actuated switches 6 and 7 are open and the switch contact $5_a$ is closed and contact $5_b$ is open and the shutter release switch contact $2_b$ is closed. The capacitor 19 is thus fully charged since its charging circuit through switches 5, 2 and 1 are closed. The triggering voltage is applied to switch amplifier 20. The depression of trigger release switch 2 closes contact $2_a$ to complete the circuit to switch amplifier 20 and thereby energize the solenoid 21 which releases the shutter and closes b 7, the closing camera shutter, in turn, closing switch 4. Upon release of the switch 2 contact $2_a$ is opened to open the circuit to amplifier 20 and deenergize solenoid 21 and thereby to open switch 7, and contact $2_b$ is closed to energize the RC network 8, 9 and to charge the capacitor 9 at a rate dependent on the RC circuit parameters. When the voltage on capacitor 9 reaches a predetermined value the controlled switch amplifier 10 energizes the solenoid 11 to close switch contact $5_b$ and switch 6. The closing of switch contact $5_b$ completes the motor energization circuit and the circuit energizing the lamp 12 and amplifier 15. The motor 17 advances the film and rotates the chopper 13 so that the light incident in photocell 14 is periodically interrupted to produce a correspondingly varying signal which is amplified and rectified by detector 16 and the rectified signal which is amplified and rectified by detector 16, and the rectified signal energizes the relay solenoid 11. As the film approaches the end of its frame advance the switch 4 is opened, but the motor 17 continues to rotate since the solenoid 11 is energized by the rectified amplified varying signal effected by the motor driven chopper 13. When the film is stopped at the end of the frame advance, the motor 17 is likewise stopped under the load of the stopped film, thereby stopping the chopper 13 and the varying signal. As a consequence the signal output of detector 16 drops to deenergize the solenoid 11 thereby opening switch contact $5_b$ to open the motor energizing circuit. The switch contact $5_a$ is closed and switch 6 is opened so that, after a predetermined interval depending on the parameters of the RC network 18, 19 a triggering voltage builds up on capacitor 19 to activate the switch amplifier 20. The mechanism is now ready for a repetition of the above cycle or operating sequence.

It should be noted that the time delay effected by the RC network 18, 19 is to permit the full relaxation of the film following the advance thereof before exposure is effected by the shutter release. The RC network 8, 9 functions, for among other purposes, to prevent the energization of solenoid 11 and motor 17 and the start of film advance before the released shutter reaches its fully closed position. For this purpose, it should be noted, the RC network 8, 9 may be obviated if the operation of the camera is such that the switch 2 does not return to close the contact $2_b$ until the shutter is fully closed or a suitable mechanism may be provided to this end.

In order to achieve rapid sequence photography, the switch 3 is closed and the switch 2 depressed to close contact $2_a$ for as long as successive exposures are desired. With the initial closing of contact $2_a$ the shutter is released and the film is then advanced a single frame in the manner described above. When the motor 17 is stopped upon completion of the film frame advance, the relay 11 is deenergized to close switch contact $5_a$ and open switch 6. The capacitor 19 previously discharged by the closed switch 6, charges to the amplifier triggering voltage in a predetermined interval sufficient to effect the film relaxation, and the solenoid 21 is energized to again release the shutter. The film frame advance and shutter release is periodically repeated as long as the switch 2 is depressed since the switch 3 is closed and the need to move the switch 2 between opposite positions is obviated. The time required for a full sequence or cycle is determined in part by the time constant of the RC network 8, 9 Thus the time between successive exposures may be adjusted by the variable resistor 8, an increase and decrease in its resistance resulting in an increase and decrease, respectively in the exposure and film advance cycle interval. Moreover, by providing any suitable or well-known timing mechanism which keeps the switch 2 in a depressed condition with contact $2_a$ closed, for a fixed interval, the number of frames which are exposed in a sequence may be set and the number of frames in such sequence may be varied by adjusting the variable resistor 8 or the closed interval of contact $2_a$ or both. It should be noted that if the switch 2 is released before the completion of a cycle to open contact $2_a$, the cycle will advance to completion in the manner described in connection with a single frame exposure operation.

While there has been described and illustrated a preferred embodiment of the present invention, it is apparent that numerous alterations, omissions and additions may be made without departing from the spirit thereof.

What we claim is:

1. In a camera including a film metering device for retarding the film up on an incremental advance thereof, an automatic film advancing mechanism comprising a film advancing drive motor, first means responsive to the rotation of said motor for producing an electrical control signal, second means including a first switching network responsive to said control signal for connecting said motor to a source of motor energizing current and for disconnecting said motor from said current source upon the slowing of said motor consequent to the loading thereof by said metered film and means including a first selectively actuatable switch for initially connecting said motor to said energizing current.

2. The automatic film advancing mechanism of claim 1, wherein said control signal is a periodically varying electrical signal and said switching network responds only to said periodically varying signal.

3. The automatic film advancing mechanism of claim 2, wherein said switching network includes an AC amplifier having said control signal applied to its input.

4. The automatic film advancing mechanism of claim 2, wherein said signal producing means comprises a light source, a photosensitive element exposed to said light source and means driven by said photosensitive member.

5. The automatic film advancing mechanism of claim 1, including a shutter release member and means including an RC timing network for restricting the actuation of said shutter release member for a predetermined interval following the deenergization of said motor.

6. An automatic film advancing mechanism in a camera having a shutter, comprising a film advancing electric drive motor, means including a normally open relay actuated first switch connecting said drive motor to a source of current, selectively operated means for closing said first switch, and means including an RC controlled solid state switch preventing the closing of said first switch during a predetermined interval after said shutter reaches a predetermined position upon the release thereof.

7. In a camera including a film metering device, an automatic film advancing mechanism comprising a film advancing electric drive motor, first means responsive to the rotation of said motor for producing an electrical control signal, second means including a first switching network responsive to said control signal for connecting said motor to a source of motor energizing current, a camera shutter release member, and means including an RC network controlled switch for energizing said motor a predetermined time interval following the actuation of said shutter release member.

8. The automatic film advancing mechanism of claim 7 wherein said RC network is adjustable.

9. In a camera including a film metering device, an automatic film advancing mechanism comprising a film advancing drive motor, first means responsive to the rotation of said motor for producing a control signal which periodically varies in response to the rotation of said motor, second means including a first switching network responsive to said control signal for connecting said motor to a source of motor energizing current, second means comprising a relay switch including an actuating solenoid and a solenoid energizing network responsive to said periodically varying control signal, said motor being connected through said relay switch to a source of current, a switch responsive to the closing of the camera shutter, a time delay network having an input connected through said shutter responsive switch to a source of current and an output, and means responsive to the output of said delay network for energizing said actuating solenoid.

10. The automatic film advancing mechanism of claim 9 including a shutter release member, means including a switch for actuating said shutter release member, and means responsive to said actuating solenoid for disabling said shutter release actuating means during the rotation of said motor.

11. In a camera including a film metering device an automatic film advancing mechanism in a camera having a shutter, comprising a film advancing electric drive motor, means including a normally open switch connecting said drive motor to a source of current, and means for closing said switch a predetermined time interval after the closing of said camera shutter, said switch closing means comprising a signal controlled switch actuating network and means for applying a control signal thereto including a variable time delay network having an output connected to said actuating network and means connecting said time delay network to a source of current including a switch actuated upon the closing of said shutter.

12. The camera of claim 11, wherein said time delay network includes a capacitor and a variable resistor connected in series with said shutter actuated switch, said capacitor being connected to said switch actuating network.

13. In an automatic film advancing camera, a film advancing drive motor, means for energizing and deenergizing said motor for effecting a film advance, shutter release actuating means including a shutter release member, shutter release member control means including a solid state switch for selectively actuating said shutter release member, and alternatively settable to a responsive or a nonresponsive condition, and means including an RC timing network for activating said control means a predetermined interval following the deenergizing of said motor.

14. The camera of claim 13, wherein said shutter release member comprises a solenoid, said solid state switch is connected in series with said solenoid and has a control input, and said timing network having has an output connected to said switch input and an input, and means responsive to the deenergization of said motor for applying a signal to said timing network input.

15. The camera of claim 14, wherein said timing network comprises a series connected resistor and capacitor, said capacitor being connected across said switch input, and said signal applying means includes a second switch connected in said delay network and means for controlling said second switch in response to the state of energization of said motor.

16. In a camera including a film metering device an automatic film advancing mechanism comprising a film advancing drive motor, first means responsive to the rotation of said motor for producing a control signal, second means including a first switching network responsive to said control signal for connecting said motor to a source of motor energizing current, means including a switch for connecting said motor to said current source independently of said control signal, a first selectively actuatable switch, a signal responsive solid state second switch, a shutter release member comprising a solenoid connected through said first switch and said second switch to a source of current, means including an RC network controlling said second switch for restricting the actuation of said shutter release member for a predetermined interval following the deenergization and stopping of said motor and including a time delay trigger network having an output connected to the control input of said second switch and an input connected to source of current in response to the stopping of said motor.